/ 21/86    OR    4,565,421

United States Patent [19]
Minoura

[11] Patent Number: 4,565,421
[45] Date of Patent: Jan. 21, 1986

[54] PLURAL-BEAM SCANNING APPARATUS

[75] Inventor: Kazuo Minoura, Yokohama, Japan

[73] Assignee: Canon Kabushiki Kaisha, Tokyo, Japan

[21] Appl. No.: 500,072

[22] Filed: Jun. 1, 1983

[30] Foreign Application Priority Data

Jun. 4, 1982 [JP] Japan ................................ 57-95895

[51] Int. Cl.[4] ............................................ G02B 27/17
[52] U.S. Cl. .................................................. 350/6.8
[58] Field of Search ...................................... 350/6.8

[56] References Cited
U.S. PATENT DOCUMENTS 4,423,426  12/1983  Kitamura ............................ 350/6.8
4,474,422  10/1984  Kitamura ............................ 350/6.8

Primary Examiner—John K. Corbin
Assistant Examiner—Rebecca D. Gass
Attorney, Agent, or Firm—Fitzpatrick, Cella, Harber & Scinto

[57] ABSTRACT

A plural-beam scanning apparatus comprises a light source unit having a plurality of light-emitting portions, a deflector for deflecting the light beams from the light-emitting portions, a prism for refracting the light beams from the light-emitting portions so that the central light rays of the light beams emitted from the light-emitting portions of the light source unit as if they originated from or pass through substantially the same point, and an imaging system for rendering that same point and a point near the reflecting surface of the deflector optically conjugate.

10 Claims, 8 Drawing Figures

PLURAL-BEAM SCANNING APPARATUS

BACKGROUND OF THE INVENTION

1. Field of the Invention

This invention relates to a scanning apparatus which uses a semiconductor laser array as a light source unit.

2. Description of the Prior Art

In prior art, as shown in Japanese Laid-open Patent Application No. 158251/1979, assuring dense scanning-line-pitch with the use of a so-called semiconductor laser array having a plurality of light output portions arranged side by side requires that the direction of the semiconductor laser array is inclined not in a direction orthogonal to the scanning line but obliquely with respect thereto. Each light flux from such a semiconductor laser array diverges with respect to a light ray (central light ray) travelling in a direction parallel to the normal to the end surface of the array.

FIG. 1 of the accompanying drawings shows an example of the plural-beam scanning apparatus according to the prior art. Central light rays ha and hb are emitted parallel to the optical axis g of a condenser lens 2 from a plurality of light output portions 1a and 1b provided in a semiconductor laser device 1. These central light rays pass through the focus F of the condenser lens 2 and pass through a cylindrical lens 3, and thereafter reach the deflecting mirror surface 4a of a deflector 4. At this time, the central light rays ha and hb from the light output portions 1a and 1b are reflected in the deflected direction of the light flux by the deflecting mirror at positions spaced apart from each other on the deflecting mirror surface 4a.

The cylindrical lens 3 causes the light fluxes emitted from the light output portions 1a and 1b and passed through the condenser lens 2 to be imaged as linear images near the deflecting mirror surface 4a. The light fluxes reflected by the deflecting mirror surface 4a are imaged on the surface of a medium to be scanned 6 such as a photosensitive medium by an anamorphic scanning lens system 5.

FIG. 2 of the accompanying drawings shows the manner of imaging in a plane orthogonal to FIG. 1, and use is made of an anamorphic scanning lens which renders a point near the deflecting mirror surface 4a and a point on the surface of the photosensitive medium conjugate. The anamorphic scanning lens 5 comprises, for example, a spherical lens 5a and a toric lens 5b.

The central light rays ha and hb emitted from the light output portions 1a and 1b of the semiconductor laser device enter the positions spaced apart from each other on the deflecting mirror surface 4a, as previously described. That is, as regards the central positions of the linear images formed by the cylindrical lens 3, the central position of only the linear image corresponding to any one of the plurality of light output portions can be installed at a desired position, but the central positions of the other linear images are spaced apart from the desired position. The optical path indicated by broken lines in FIG. 2 shows the manner of imaging in this case, and the central position P of the deviated linear image deviates from the desired position and is not imaged on the surface of the medium to be scanned 6 by the lens system 5 but is imaged at a point P' spaced apart from the surface of the medium to be scanned and thus, so-called defocus occurs. When the deflecting mirror 4 is rotated, the amount of defocus thereof becomes remarkably greater and the imaged spot on the surface of the medium to be scanned becomes large.

To overcome this difficulty, the present applicant has proposed, in U.S. Pat. No. 4,474,422 (issued Oct. 2, 1984), to set the position of the exit pupil of a collimating portion for collimating the light flux from the light source closely adjacent to the deflecting-reflecting surface of the deflector.

SUMMARY OF THE INVENTION

It is an object of the present invention to overcome the above-noted disadvantages and to provide a scanning apparatus in which each beam spot is well imaged on a surface to be scanned even if use is made of a light source such as a semiconductor laser array.

It is a further object of the present invention to provide a scanning apparatus which is simple to manufacture, and low in cost, and compact.

In a plural-beam scanning apparatus according to the present invention, a prism for bending the direction of a light flux emitted from each light-emitting portion of a semiconductor laser is provided adjacent to each light-emitting surface of the semiconductor laser so that the central light rays of the light fluxes are emitted from the light-emitting portions of the semiconductor laser as if they originate from or pass through substantially the same point as viewed from a direction perpendicular to a deflection-scan plane, namely, a plane which the normal to the deflecting-reflecting surface of a deflector forms with lapse of time as the deflecting-reflecting surface is rotated. An optical system is set so that said same point and a point near the deflecting-reflecting surface of deflecting means are in an optically conjugate relation in the deflection-scan plane, thereby achieving the above objects. The expression that the central light rays of the light fluxes emitted from the semiconductor laser pass through substantially the same point means that the points of light emission of the semiconductor laser are disposed with slight distances in a direction orthogonal to the deflection-scan plane and therefore the respective light fluxes have their directions controlled so that the central light rays are in a spatially "skewed" or "twisted" relation at a certain point. Accordingly, if viewed from a direction perpendicular to the deflection-scan plane, the central light rays of those light fluxes appear as if they intersected each other at a point, but if viewed from the deflection-scan plane, those light rays are slightly displaced in a direction orthogonal to the deflection-scan plane.

In a scanning apparatus according to the present invention, the effect to which the invention is directed can of course be obtained even if design is not made such that the central light rays of the light beams intersect each other strictly at a point but if the central rays are converged in a certain area to some degree.

The invention will become more fully apparent from the following detailed description thereof taken in conjunction with the accompanying drawings.

DESCRIPTION OF THE PREFERRED EMBODIMENTS

Figure 1:
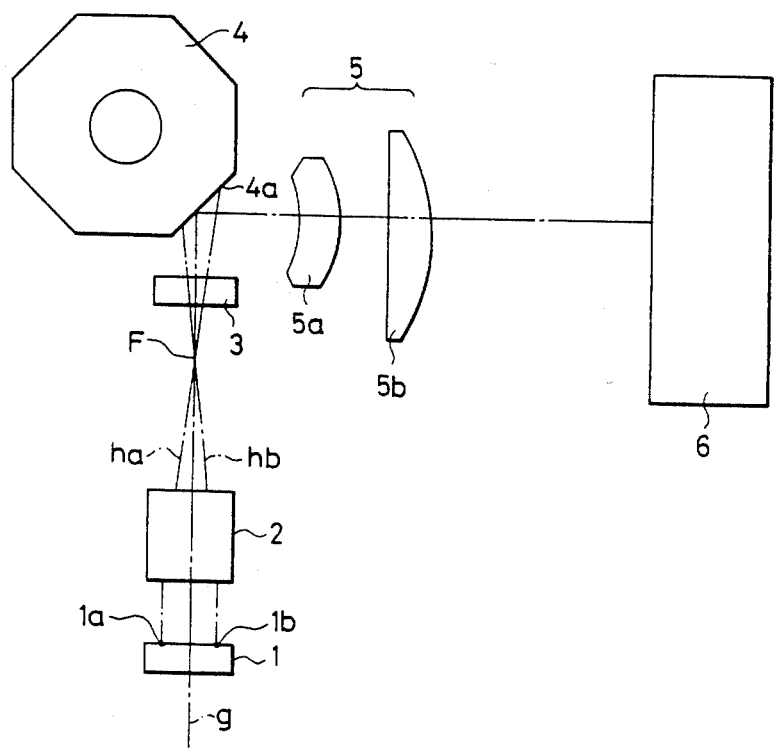
FIGS. 1 and 2 show a plural-beam scanning apparatus according to the prior art.
Figure 2:
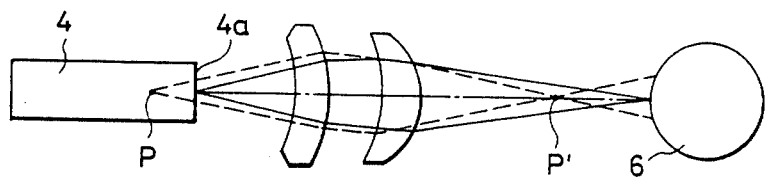
Figure 3:
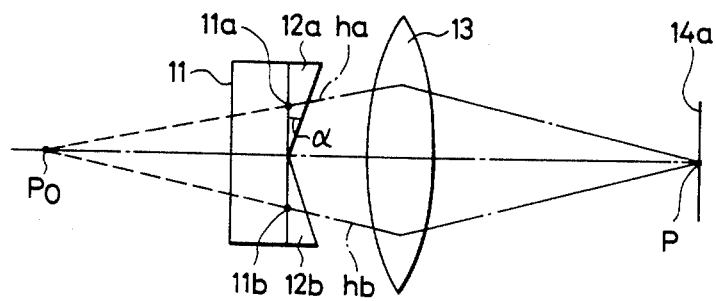
FIGS. 3, 4 and 5 illustrate plural-beam scanning apparatuses according to the present invention.

FIG. 3 is a view for illustrating the principle of the scanning apparatus according to the present invention, and shows the optical system between a light source and a deflector as seen from a direction perpendicular to the deflection-scan plane. Reference numeral 11 designates a semiconductor laser having two light-emitting portions 11a and 11b, and reference characters 12a and 12b denote prisms for controlling the directions of laser beams emitted from the light-emitting portions 11a and 11b. The prisms should preferably be adhesively secured to the light-emitting surfaces of the semiconductor. The light flux emitted from the light-emitting portion 11a of the semiconductor laser has its direction changed by the prism 12a as if the central light ray ha thereof originated from or passed through a point Po. Also, the light flux emitted from the light-emitting portion 11b has its direction changed by the prism 12b as if the central light ray hb thereof were a light ray originating from or passing through the point Po. The central light rays ha and hb appear to intersect each other at the point Po, but strictly speaking, the central light rays ha and hb are in a spatially skewed or twisted positional relation because the light-emitting portions 11a and 11b of the semiconductor laser are slightly displaced in a direction perpendicular to the plane of the drawing sheet and therefore, it would be correct to say that Po is the position of twist of the central light rays ha and hb when viewed from a direction orthogonal to the deflection-scan plane, but herein it is called the point Po for the sake of convenience. This point Po and a point P near the deflecting-reflecting surface 14a of a deflector 14 are kept optically conjugate with respect to an imaging optical system 13. Accordingly, at the point P near the deflecting-reflecting surface, the central light ray of each light flux is brought into a spatially skewed or twisted positional relation and therefore, each light flux does not diverge on the deflecting-reflecting surface. Thus, each light flux is formed as a good imaging spot on a surface to be scanned.

The light-transmitting surfaces of the prisms 12a and 12b are planar and the vertical angle α thereof can be easily determined if the refractive index of the prism material and the position of the point Po are determined. Although not shown in FIG. 3, the optical system disposed between the deflector and the surface to be scanned may be such an optical system that keeps the point P and the surface to be scanned in an optically conjugate relation.

Figure 4:
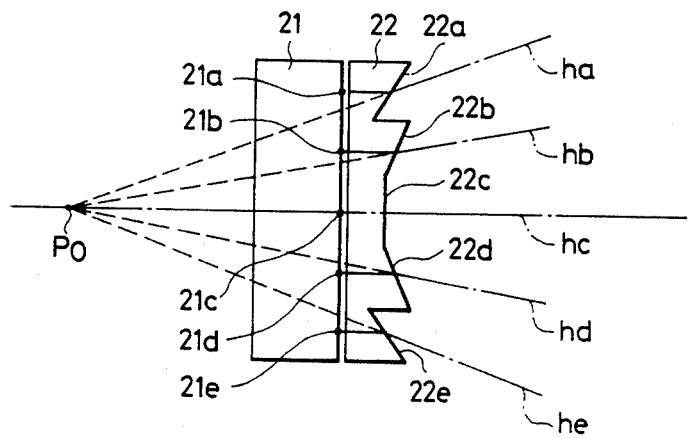

FIG. 4 shows a cross-section of the prism in case the semiconductor array laser has five light-emitting portions. Designated by 21 is the semiconductor array laser having five light-emitting portions 21a, 12b, 21c, 21d and 21e, and denoted by 22 is the prism. The central light ray ha of the light flux from the light-emitting portion 21a is refracted by an inclined surface 22a and bent as if it originated from or passed through the point Po. The central light ray hb from the light-emitting portion 21b is bent by an inclined surface 22b as if it originated from or passed through the point Po, the central light ray hd from the light-emitting portion 21d is bent by an inclined surface 22d as if it originated from or passed through the point Po, and the central light ray he from the light-emitting portion 21e is bent by an inclined surface 22e as if it originated from or passed through the point Po.

The central light ray hc from the light-emitting portion 21c perpendicularly passes through a flat surface 22c and the point Po lies on the extension of this central light ray hc. In this manner, the inclined flat surfaces having their angles of inclination determined correspondingly to the respectively light-emitting portions are provided and the central light ray of each light flux emergent from the prism 22 has its direction controlled as if it were emergent from the point Po. This point Po, as described above, is kept conjugate with the desired point P near the deflecting-reflecting surface through an optical system.

Figure 5:
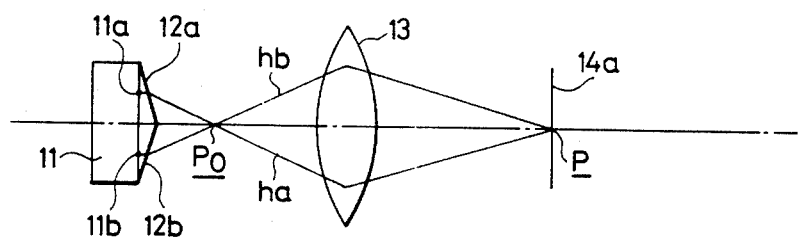

In the above-described embodiment, the central light ray of each light flux actually does not originate from or pass through the point Po, whereas by reversing the direction in which it is refracted by the prism, the central light ray of each light flux can be caused to actually pass this position Po. FIG. 5 shows an example thereof wherein prisms 12a and 12b are disposed with their inclined surfaces reversed so that each light flux passed through the prisms travels through point Po when viewed in the plane perpendicular to the deflection-scan plane. That is, the central light rays ha and hb of the light fluxes from the light-emitting portions 11a and 11b of the semiconductor laser 11 are spatially skewed or twisted at the point Po, and this point Po and the point P near the deflecting-reflecting surface 14a are at optically conjugate positions with respect to the imaging optical system 13.

Alternatively, the prisms may be formed so that the point Po shown in FIG. 5 is formed on that side of the imaging optical system 13 which is adjacent to the deflector. In this case, however, the central light rays actually do not pass through the point Po, but if the prisms are formed so that the point Po is created more adjacent to the deflector than the position of the focal length of the imaging optical system 13, the spacing between the imaging optical system 13 and the deflecting-reflecting surface 14a can be set to a value shorter than the focal length of the imaging optical system 13. Where the distance between the condenser lens 13 and the deflecting-reflecting surface 14a is thus either longer or shorter than the focal length of the condenser lens, prisms accommodating each case may be used, whereby the linear image can be disposed at a desired position.

Figure 6A:
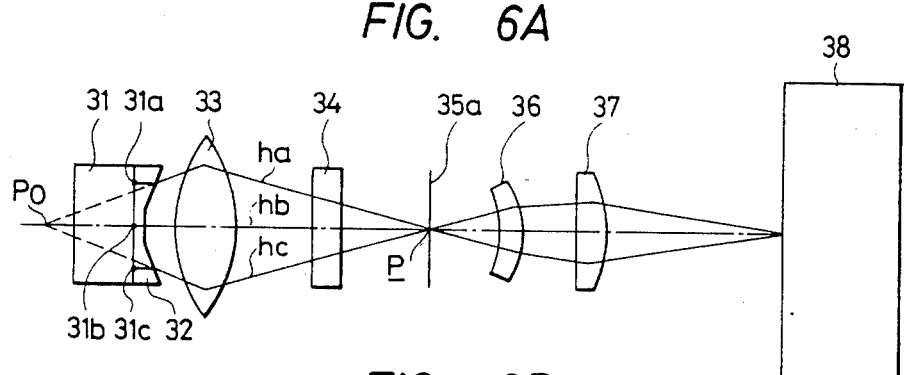
FIGS. 6A, 6B and 6C show an embodiment of a tilt-correcting scanning optical system to which the apparatus of the present invention is applied.
Figure 6B:
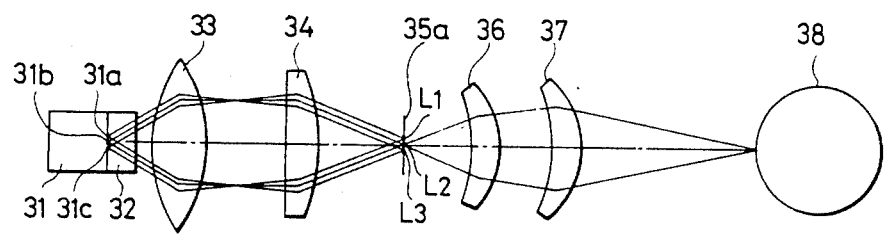

FIGS. 6A and 6B are schematic developed views showing an embodiment of a tilt-correcting scanning apparatus to which the scanning apparatus according to the present invention is applied, FIG. 6A being a plan view, namely, a view showing the state of the light beam in the scanning surface, and FIG. 6B being a front view, namely, a view showing the state of the light beam in the tilt-correcting surface. The light fluxes emitted from the light-emitting portions 31a, 31b and 31c of a semiconductor laser 31 are bent by a prism 32 as if the central light rays thereof were emitted from a position Po, and enter a condenser lens 33. The condenser lens 33 renders the position Po and a point P near the deflecting-reflecting surface 35a of a deflector 35 optically conjugate. Accordingly, the central light rays ha, hb and hc of the respective light fluxes are converged at the point P.

Figure 6C:
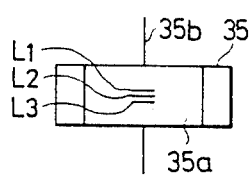

On the other hand, in the tilt-correcting cross-section, the positions of the light-emitting portions 31a, 31b and 31c of the semiconductor laser and the focus position of the condenser lens 33 are substantially coincident with one another and therefore, each light flux is collimated by the condenser lens 33. These collimated light fluxes are condensed by a positive cylindrical lens 34 having a power only in the tilt-correcting cross-section, and are imaged near the deflecting-reflecting surface 35a. Accordingly, near the deflecting-reflecting surface 35a of the deflector 35, three linear images L1, L2 and L3 are formed while being arranged in the direction of the rotational axis 35b of the deflector, as shown in FIG. 6C. These linear images are imaged as good spots on a rotatable drum 38 by a scanning lens system comprising a spherical lens 36 and a toric lens 37 as shown in Japanese Patent Application Laid-open No. 36622/1981. In FIG. 6B, the imaging light flux only of L2 is shown as a representative.

In a scanning apparatus according to the invention, the effect is great in case the light output portion of the semiconductor laser is a monolithic array. That is, the array pitch of the light output portion is of good manufacturing accuracy and has little irregularity in the case of a monolithic array laser. Accordingly, the alignment with the previously described prism becomes easy. That is, a prism treated in advance with the shape thereof (the arrangement pitch of inclined surfaces) corresponding to the array pitch of the laser may be adhesively secured to the light emitting face of the semiconductor array laser.

Thus, the scanning apparatus according to the present invention, in spite of its simple construction, enables a plurality of scanning spots to scan the surface to be scanned in a good imaged condition.

What I claim is:

1. A plural-beam scanning apparatus comprising:
   a light source unit having a plurality of light-emitting portions each for emitting a light beam;
   deflecting means having a reflecting surface for deflecting the light beams emitted from said light-emitting portions in at least one deflection-scan plane;
   prism means for refracting the light beams emitted from said light-emitting portions so that the central light rays of all of the light beams emitted from the light-emitting portions of said light source unit are caused to pass through substantially the same point when viewed in a direction perpendicular to the deflection-scan plane; and
   imaging means for rendering said same point and a point near said reflecting surface of said deflecting means optically conjugate.

2. A plural-beam scanning apparatus according to claim 1, wherein said light source unit is a semiconductor array laser.

3. A plural-beam scanning apparatus according to claim 1, wherein said prism means is adhesively secured to said light source unit, and said prism means and said light source unit are assembled integrally with each other.

4. A plural-beam scanning apparatus comprising:
   a light source unit having a plurality of light-emitting portions each for emitting a light beam;
   deflecting means having a reflecting surface for deflecting the light beams from said light-emitting portions in at least one deflection-scan plane;
   prism means for refracting the light beam emitted from said light emitting portions so that the central light rays of all of the light beams emitted from the light-emitting portions of said light source unit are caused to pass through substantially the same point when viewed in a direction perpendicular to the deflection-scan plane;
   anamorphic optical means disposed between said prism means and said deflecting means for converging the light beam component in one direction of the light beam from each of said light-emitting portions near the reflecting surface of said deflecting means; and
   imaging means for rendering said same point and said reflecting surface of said deflecting means optically conjugate.

5. A plural-beam scanning apparatus according to claim 4, wherein said prism means is adhesively secured to said light source unit, and said prism means and said light source unit are assembled integrally with each other.

6. A plural-beam scanning apparatus comprising:
   a light source unit having a plurality of light-emitting portions each for emitting a light beam;
   deflecting means having a reflecting surface for deflecting the light beams emitted from said light-emitting portions in at least one deflection-scan plane;
   prism means for refracting the light beams emitted from said light-emitting portions so that the central light rays of all of the light beams are emitted from said light-emitting portions of said light source unit as if they originate from substantially the same point when viewed in a direction perpendicular to the deflection-scan plane; and
   imaging means for rendering said same point and a point near said reflecting surface of said deflecting means optically conjugate.

7. A plural-beam scanning apparatus according to claim 6, wherein said light source unit is a semiconductor array laser.

8. A plural-beam scanning apparatus according to claim 6, wherein said prism means is adhesively secured to said light source unit, and said prism means and said light source unit are assembled integrally with each other.

9. A plural-beam scanning apparatus comprising:
   a light source unit having a plurality of light-emitting portions each for emitting a light beam;
   deflecting means having a reflecting surface for deflecting the light beams from said light-emitting portions in at least one deflection-scan plane;
   prism means for refracting the light beams emitted from said light-emitting portions so that the central light rays of all of the light beams are emitted from said light-emitting portions of said light source unit as if they originated from substantially the same point when viewed in a direction perpendicular to the deflection-scan plane;
   anamorphic optical means disposed between said prism means and said deflecting means for converging the light beam component in one direction of the light beam from each of said light-emitting portions near the reflecting surface of said deflecting means; and
   imaging means for rendering said same point and said reflecting surface of said deflecting means optically conjugate.

10. A plural-beam scanning apparatus according to claim 9, wherein said prism means is adhesively secured to said light source unit, and said prism means and said light source unit are assembled integrally with each other.

* * * * *

UNITED STATES PATENT AND TRADEMARK OFFICE
CERTIFICATE OF CORRECTION

PATENT NO. : 4,565,421
DATED : January 21, 1986
INVENTOR(S) : KAZUO MINOURA

It is certified that error appears in the above-identified patent and that said Letters Patent is hereby corrected as shown below:

Column 2, line 18, change "and low" to --low--.

Column 3, line 55, change "21a, 12b, 21c," to --21a, 21b, 21c,--.

Column 5, line 25, change "light emitting" to --light-emitting--;
line 64, change "light beam" to --light beams--; and
line 65, change "light emitting" to --light-emitting--.

Signed and Sealed this

Twenty-sixth Day of August 1986

[SEAL]

Attest:

DONALD J. QUIGG

Attesting Officer

Commissioner of Patents and Trademarks